(12) United States Patent
Blumberg et al.

(10) Patent No.: US 8,442,550 B2
(45) Date of Patent: *May 14, 2013

(54) SYSTEM AND METHOD FOR PROVIDING INFORMATION BASED ON GEOGRAPHIC POSITION

(75) Inventors: Brad W. Blumberg, Voorhees, NJ (US); Eric M. Blumberg, Ventnor, NJ (US)

(73) Assignee: Smarter Agent, LLC, Camden, NJ (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/275,683

(22) Filed: Nov. 21, 2008

(65) Prior Publication Data
US 2009/0163228 A1 Jun. 25, 2009

Related U.S. Application Data

(63) Continuation of application No. 10/644,060, filed on Aug. 20, 2003, now Pat. No. 7,457,628, which is a continuation-in-part of application No. 09/774,119, filed on Jan. 31, 2001, now Pat. No. 7,072,665, which is a continuation-in-part of application No. 09/639,265, filed on Aug. 15, 2000, now Pat. No. 6,385,541.

(60) Provisional application No. 60/404,776, filed on Aug. 21, 2002, provisional application No. 60/186,155, filed on Feb. 29, 2000.

(51) Int. Cl.
*H04W 24/00* (2009.01)
*G06Q 10/00* (2006.01)
*G06Q 30/00* (2006.01)
*G06Q 50/00* (2006.01)

(52) U.S. Cl.
USPC ............. 455/456.1; 455/456.3; 455/456.6; 455/457; 705/1.1; 705/26.1; 705/313; 705/314

(58) Field of Classification Search ....... 455/456.1–457; 705/1.1, 26.1, 313, 314
See application file for complete search history.

(56) References Cited

U.S. PATENT DOCUMENTS

| | | |
|---|---|---|
| 5,032,989 A | 7/1991 | Tornetta |
| 5,058,009 A | 10/1991 | Yoshino et al. |
| 5,584,025 A | 12/1996 | Keithley et al. |
| 5,594,425 A | 1/1997 | Ladner et al. |
| 5,682,525 A | 10/1997 | Bouve et al. |

(Continued)

FOREIGN PATENT DOCUMENTS

| | | |
|---|---|---|
| GB | 2 357 167 A | 6/2001 |
| JP | 7-65070 A | 3/1995 |

OTHER PUBLICATIONS

"SnapTrack Awarded Patent for Locating or Tracking Wireless Devices Via Internet and Client-Server-Based Computer Networks", http://famulus.msnbc.com/famuluscom/businesswire01-23-050325.asp?sym=QCOM, Jan. 23, 2001.

(Continued)

*Primary Examiner* — Marisol Figueroa

(57) ABSTRACT

A system and method for providing position information using a three-dimensional based grid is provided. The position information may be relayed to an electronic device by providing location information to a database and receiving location-centric information at the electronic device. The system may include a network for continuously updating the database in real-time.

14 Claims, 8 Drawing Sheets

U.S. PATENT DOCUMENTS

| | | | |
|---|---|---|---|
| 5,684,859 A | 11/1997 | Chanroo et al. | |
| 5,794,216 A | 8/1998 | Brown | |
| 5,802,492 A | 9/1998 | DeLorme et al. | |
| 5,831,664 A | 11/1998 | Wharton et al. | |
| 5,850,433 A | 12/1998 | Rondeau | |
| 5,852,810 A | 12/1998 | Sotiroff et al. | |
| 5,901,214 A | 5/1999 | Shaffer et al. | |
| 5,930,699 A | 7/1999 | Bhatia | |
| 5,938,721 A | 8/1999 | Dussell et al. | |
| 5,944,769 A | 8/1999 | Musk et al. | |
| 5,970,478 A | 10/1999 | Walker et al. | |
| 6,009,413 A | 12/1999 | Webber et al. | |
| 6,014,645 A | 1/2000 | Cunningham | |
| 6,029,069 A | 2/2000 | Takaki | |
| 6,115,611 A | 9/2000 | Kimoto et al. | |
| 6,115,690 A | 9/2000 | Wong | |
| 6,122,520 A | 9/2000 | Want et al. | |
| 6,202,023 B1 | 3/2001 | Hancock et al. | |
| 6,321,202 B1 | 11/2001 | Raveis, Jr. | |
| 6,343,275 B1 | 1/2002 | Wong | |
| 6,343,317 B1 | 1/2002 | Glorikian | |
| 6,385,541 B1 | 5/2002 | Blumberg et al. | |
| 6,456,852 B2 | 9/2002 | Bar et al. | |
| 6,460,036 B1 | 10/2002 | Herz | |
| 6,484,176 B1 | 11/2002 | Sealand et al. | |
| 6,496,776 B1 | 12/2002 | Blumberg et al. | |
| 6,522,875 B1 | 2/2003 | Dowling et al. | |
| 6,522,889 B1 | 2/2003 | Aarnio | |
| 6,542,812 B1 | 4/2003 | Obradovich et al. | |
| 6,552,682 B1 | 4/2003 | Fan | |
| 6,564,143 B1 | 5/2003 | Alewine et al. | |
| 6,578,010 B1 | 6/2003 | Teacherson | |
| 6,587,835 B1 | 7/2003 | Treyz et al. | |
| 6,594,633 B1 | 7/2003 | Broerman | |
| 6,625,457 B1 | 9/2003 | Raith | |
| 6,636,803 B1 | 10/2003 | Hartz, Jr. et al. | |
| 6,650,902 B1 | 11/2003 | Richton | |
| 6,684,196 B1 | 1/2004 | Mini et al. | |
| 6,836,667 B1 | 12/2004 | Smith, Jr. | |
| 6,873,850 B2 | 3/2005 | Dowling et al. | |
| 6,898,434 B2 | 5/2005 | Pradhan et al. | |
| 6,912,507 B1 | 6/2005 | Phillips et al. | |
| 6,973,432 B1 | 12/2005 | Woodard et al. | |
| 7,024,205 B1 | 4/2006 | Hose | |
| 7,069,238 B2 | 6/2006 | I'Anson et al. | |
| 7,072,665 B1 | 7/2006 | Blumberg et al. | |
| 7,227,498 B2 | 6/2007 | Soliman | |
| 7,457,628 B2 | 11/2008 | Blumberg et al. | |
| 7,987,113 B2 | 7/2011 | Blumberg et al. | |
| 2001/0047282 A1 | 11/2001 | Raveis, Jr. | |
| 2002/0013852 A1 | 1/2002 | Janik | |
| 2002/0035609 A1 | 3/2002 | Lessard et al. | |
| 2002/0052814 A1 | 5/2002 | Ketterer | |
| 2002/0065739 A1 | 5/2002 | Florance et al. | |
| 2002/0069148 A1 | 6/2002 | Mutschler et al. | |
| 2002/0077966 A1 | 6/2002 | Harycki et al. | |
| 2002/0091854 A1 | 7/2002 | Smith | |
| 2002/0111890 A1 | 8/2002 | Sloan et al. | |
| 2002/0152100 A1 | 10/2002 | Chen et al. | |
| 2002/0198779 A1 | 12/2002 | Rowen et al. | |
| 2003/0014402 A1 | 1/2003 | Sealand et al. | |
| 2003/0069029 A1 | 4/2003 | Dowling et al. | |
| 2003/0083957 A1* | 5/2003 | Olefson | 705/27 |
| 2003/0092450 A1 | 5/2003 | Juppi et al. | |
| 2003/0200108 A1 | 10/2003 | Malnoe | |
| 2004/0139049 A1 | 7/2004 | Hancock et al. | |
| 2006/0006990 A1 | 1/2006 | Obradovich | |
| 2010/0023388 A1 | 1/2010 | Blumberg et al. | |

OTHER PUBLICATIONS

"Lucent Technologies and Profilium Inc. Announce Alliance Agreement to Deploy Advanced Location-Based Mobile Advertising Solution", http://www.hoovershbn.hoovers.com/bin/story?StoryId=CoM0p0bKbytiXmdi&FQ=c....%20L, Jan. 23, 2001.
"The Meaning of Telematics", http://www.globaltelematics.com/telematics.htm, Oct. 20, 2000.
HomeFinder—Find the Home That's Right for You from http://www.homefinder.com.
Printout from http://www.homescape.com/buying/.
zipRealty.com: The zipRealty.com Buyer's Advantage from http://www.ziprealty.com/buy_a_home/advantage.jsp.
Homes for Sale—MSN HomeAdvisor from http://homeadvisor.msn.com/homes/overview.asp.
REALTOR.com: Real Estate—Find a new home and a realtor from http://www.realtor.com/FindHome/default.asp.
REALTOR.com: Real Estate—Homes for Sale in New Jersey from http://www.realtor.com/newjersey/nbselnj.asp.
REALTOR.com: Real Estate—Homes for Sale in Atlantic City from http://www.realtor.com/atlanticcity/nbregion4.asp.
REALTOR.com: Find a Home—Select Property Type from http://www.realtor.com/PropType.asp?pgnum=1 &st=nj&frm=bycomm& mls=atlanticcity&mlsttl=Atlantic= City&comm.
REALTOR.com: Real Estate in Bay Area from http://www.realtor.com/selectnb.asp?frm=bvcomm&st=nj&mls=atlanticcity &mlsttl=Atlantic+City&comm=Bay+Area&.
REALTOR.com: Real Estate—Find a Neighborhood from http://www.realtor.com/FindNeig/default.asp.
Francis Hamit, "A GIS/GPS System for Fire and EMS Dispatch: Imaging Enabled" Advanced IMAGING, Getting Graphic, Jan. 1997, vol. 12, No. 1, 5 pages.
Jonathan Broadbent et al. "Location Aware Mobile Interactive Guides: Usability Issues" pp. 1-15.
M.J. O'Grady et al., "A Tourist-Centrist Mechanism for Interacting with the Environment" Practice &Research in Intelligent Systems & Media (PRIZM), Dept. of Computer Science, University College, Dublin (UCD), Belfield, Dublin 4, Ireland, pp. 56-67.
G.D. Abowd et al. "Cyberguide: A mobile context-aware tour guide", Wireless Networks, Oct. 1997, vol. 3, Issue 5, pp. 421-433.
Request for Inter Partes Reexamination U.S. Appl. No. 95/001,435 of US Patent No. 6,385,541, filed on Aug. 31, 2010.
Request for Inter Partes Reexamination U.S. Appl. No. 95/001,437 of US Patent No. 6,496,776, filed on Sep. 1, 2010.
Request for Inter Partes Reexamination U.S. Appl. No. 95/001,436 of US Patent No. 7,072,665, filed on Aug. 31, 2010.
Office Action for U.S. Appl. No. 11/426,497, mailed Sep. 7, 2011, 12 pages.
Office Action for Inter Partes Reexamination Serial No. 95/001,435 of US Patent No. 6,385,541, mailed on Dec. 21, 2010.
Office Action for Inter Partes Reexamination Serial No. 95/001,436 of US Patent No. 7,072,665, mailed on Dec. 21, 2010.
Office Action for Inter Partes Reexamination Serial No. 95/001,437 of US Patent No. 6,496,776, mailed on Dec. 21, 2010.
Response Under 37 CFR 1.111 and Proposed Amendment Under 37 CFR 1.530 and 37 CFR 1.943, for Inter Partes Reexamination Serial No. 95/001,435 of US Patent No. 6,385,541, dated Feb. 22, 2011.
Response Under 37 CFR 1.111 and Proposed Amendment Under 37 CFR 1.530 and 37 CFR 1.943, for Inter Partes Reexamination Serial No. 95/001,436 of US Patent No. 7,072,665, dated Feb. 22, 2011.
Response Under 37 CFR 1.111 and Proposed Amendment Under 37 CFR 1.530 and 37 CFR 1.943, for Inter Partes Reexamination Serial No. 95/001,437 of US Patent No. 6,496,776, dated Feb. 22, 2011.
Third Party Requesters' Comments Subsequent to Patent Owner's Response Under 37 CFR §1.947 for Inter Partes Reexamination Serial No. 95/001,435 of US Patent No. 6,385,541, filed on Mar. 24, 2011.
Third Party Requesters' Comments Subsequent to Patent Owner's Response Under 37 CFR §1.947 for Inter Partes Reexamination Serial No. 95/001,436 of US Patent No. 7,072,665, filed on Mar. 24, 2011.
Third Party Requesters' Comments Subsequent to Patent Owner's Response Under 37 CFR §1.947 for Inter Partes Reexamination Serial No. 95/001,437 of US Patent No. 6,496,776, filed on Mar. 24, 2011.
Action Closing Prosecution of Inter Partes Reexamination of US Patent No. 6,496,541, Control No. 95/001,435, mailed Nov. 10, 2011, 51 pages.

Patent Owner Comments Under 37 CFR §1.951(a) for Inter Partes Reexamination of US Patent No. 6,496,541, Control No. 95/001,435, filed Nov. 17, 2011; 30 pages.

Declaration of John Moring submitted with Patent Owner Comments on Nov. 17, 2011 in Inter Partes Reexamination of US Patent No. 6,496,541, Control No. 95/001,435, 24 pages.

Action Closing Prosecution of Inter Partes Reexamination of US Patent No. 6,496,776, Control No. 95/001,437, mailed Nov. 18, 2011, 46 pages.

Patent Owner Comments Under 37 CFR §1.951(a) for Inter Partes Reexamination of US Patent No. 6,496,776, Control No. 95/001,437, filed Dec. 19, 2011; 23 pages.

Declaration of John Moring submitted with Patent Owner Comments on Dec. 19, 2011 in Inter Partes Reexamination of US Patent No. 6,496,776, Control No. 95/001,437, 24 pages.

Office Action for U.S. Appl. No. 13/592,411, mailed on Jan. 30, 2013, 10 pages.

Third Party Requesters' Comments Under 37 CFR 1.951(b) for Inter Partes Reexamination of US Patent No. 7,072,665, Control No. 95/001,436, filed on Dec. 13, 2012, 49 pages.

Cross-Appeal Brief of Third-Party Requesters for Inter Partes Reexamination of U.S. Patent No. 6,496,776, Control No. 95/001,437, filed on Jan. 11, 2013, 44 pages.

Patent Owner's Appellant's Brief for Inter Partes Reexamination of U.S. Patent No. 6,496,776, Control No. 95/001,437, filed on Jan. 14, 2013, 40 pages.

Patent Owner's Respondent's Brief for Inter Partes Reexamination of U.S. Patent No. 6,496,776, Control No. 95/001,437, filed on Feb. 11, 2013, 15 pages.

Respondents' Brief of Third-Party Requesters for Inter Partes Reexamination of U.S. Patent No. 6,496,776, Control No. 95/001,437, filed on Feb. 14, 2013, 26 pages.

* cited by examiner

SYSTEM AND METHOD FOR PROVIDING INFORMATION BASED ON GEOGRAPHIC POSITION

CROSS-REFERENCE TO RELATED APPLICATIONS

This application is a continuation of U.S. patent application Ser. No. 10/644,060 entitled "System and Method for Providing Information Based on Geographic Position," filed Aug. 20, 2003 now U.S. Pat. No. 7,457,628, which claims priority under 35 U.S.C. 119(e) to U.S. Provisional Application Ser. No. 60/404,776 entitled "System and Method for Providing Position Information," filed on Aug. 21, 2002. This application is a continuation-in-part of U.S. patent application Ser. No. 09/774,119 entitled "Position-Based Information Access Device and Method of Searching," filed on Jan. 31, 2001 now U.S. Pat. No. 7,072,665, which is a continuation-in-part of U.S. patent application Ser. No. 09/639,265 entitled "Global Positioning-Based Real Estate Database Access Device and Method," filed on Aug. 15, 2000 now U.S. Pat. No. 6,385,541, which claims priority under 35 U.S.C. 119(e) to U.S. Provisional Application Ser. No. 60/186,155 entitled "Global Positioning-Based Real Estate Database Access Device and Method," filed on Feb. 29, 2000. Each of the above applications are hereby incorporated by reference in their entirety.

BACKGROUND OF THE INVENTION

1. Field of the Invention

The invention relates to a method and apparatus for accessing and managing information, and, more particularly to method and apparatus for obtaining real-time updates about an individual's surroundings based on their position.

2. Description of the Related Art

People often desire to obtain information about a particular location at which they are located, whether it be a famous or historic landmark, an office building, a business location, a piece of real estate, an airport, a hotel, shopping mall, a sports arena, a tropical rain forest, a redwood forest, a mountain range, a river, a single island or a string of islands, a war zone, or a hostage area. The traditional methods of obtaining such information include using printed materials such as guide books, maps, etc., communicating with people knowledgeable about the particular location, and researching the particular location either before or after being physically present at the location.

Such methods of obtaining information may significantly detract from the person's ability to appreciate or experience the location at which they are present. Put more simply, the person may not be able to gather or access enough information about the location because it is not readily available. Additionally, the person may not be able to access information about the location that is based on time. For example, if a person is visiting a famous landmark at a time when there are no tour guides available and the local gift shop is closed, the person may not be able to obtain valuable information about the landmark. While tour guides typically are associated with famous landmarks, landmarks as used in this context may be a famous or non-famous landmark, including, but not limited to the following types of landmarks: a historic area, an amusement park, open houses (i.e., in the real estate context), a group of substantially co-located restaurants. Although the person may be able to get location-centric information later, that isn't always a suitable alternative. Even in the event where a person is able to obtain printed materials, they are often cumbersome to carry around and read through while traveling from place to place. Moreover, as a person visits numerous locations, they tend to accumulate vast amounts of printed materials.

Another example in which location-specific, or time sensitive information is not readily obtained is during a real estate search. The traditional method of buying real estate requires the prospective purchaser to transact through a real estate broker for virtually every aspect of the transaction, from finding a desired property to completing the sale. Often the most difficult part of the process, from the buyer's perspective, is locating a desired piece of real estate. There are generally two methods employed to locate a desired piece of property.

The first method relies solely on the real estate broker to use his or her contacts, including listing services, to locate property that meets the buyer's specifications. The second is more random, in that if a buyer happens to pass a piece of property that is displaying a "for sale" sign, the buyer can write down the phone number shown on the sign to later inquire about the property, which then places the transaction totally within the broker's hands, as the broker controls all the information relating to the property (e.g., size and cost).

People also have a difficult time finding exactly the right features in their house search or have trouble adding exactly the right features to their existing homes. People generally have difficulty finding exactly the right manufacturer or service provider to provide particular features for their home or office. Moreover, it is difficult to find an architect to design a home of the style that a person desires, or to find a landscaper or gardener to achieve a look that a person wants, etc. Most often, people will look in the phone book to get a list of service providers or manufacturers and then end up driving all over town to review samples of various service providers' work.

People are also often interested in events that are occurring relative to their position. For example, people that are traveling are often concerned about the position of a storm that may interfere with their travel plans. Therefore, systems that may relay information about the environment and based on the position and relative movements of both the storm, for example, and the electronic device used by the user are needed.

Over the last few years, various computer-related methods for locating real estate have been introduced. For example, U.S. Pat. No. 5,032,989 relates to a computerized map-based real estate search system in which a user can zoom in on a map to greater levels of detail, in order to obtain a more accurate view of the location of an available piece of property. The mapping system in the '989 patent is centered about a user-selectable landmark, and the different maps that are generated are also centered about the landmark. There is an associated property database that can be accessed remotely either by searching by specified criteria or by using the mapping system. Additionally, U.S. Pat. No. 5,852,810 covers an Internet map-based real estate search system that operates in a similar manner to the '989 patent. The system disclosed in the '810 patent also permits a user to search criteria after narrowing the map-based search down to the city level, thereby allowing a criteria-based search in addition to a location-based search.

When accessing property information via a computer, it is often desirable to view an image of the property at the same time. In this regard, U.S. Pat. No. 5,794,216 is directed to an interactive multimedia real estate database including interior images and exterior images of the selected house, the floor plan of the house, a textual description of the property, etc.

Additionally, links are provided on the exterior image of the house that, if clicked, permit the user to view the interior of the corresponding room.

The foregoing patents require a user to be located at a computer, and remote from the property. The technology disclosed in these patents is not effective when a buyer is driving past a particular piece of property and would like additional information about that property. It would be desirable for a prospective buyer to be able to access information relating to a piece of property as the buyer was present at the property, at any time of day, and whether or not the property displayed a "for sale" sign. This type of information is ideally suited to be transmitted via a wireless device. Furthermore, it would be advantageous to transmit location-centric information to a user by location, even where the user is not aware of the particular address of the location.

U.S. Pat. No. 5,930,699 relates to an address retrieval system based on the position of a cellular telephone. A cell phone user can request information relating to businesses that are located in the proximity of the user, based upon the geographic position of the user as determined by pinpointing the location of the cell phone. Once the location of the user is determined, a database that is keyed on geographic location is searched, looking for businesses of the type requested by the user (e.g., restaurants, gas stations, hotels, etc.) that are located in the area around the user. The system disclosed in the '699 patent may inform a user about a location of a restaurant (or other service location) but does not give the user real-time information pertaining to table availability, hours of operation, current specials. Furthermore, the system of the '699 patent does not compare table availability of a number of substantially co-located restaurants.

U.S. Pat. No. 5,938,721 discloses a mobile computer system having a built-in global positioning system (GPS) locator and an associated database that displays relevant information to the user based upon the user's current location. The database is accessed in real time as the user's position changes and is primarily focused on task-based information. For example, if a stored task is to buy milk, as the user approaches the grocery store, he or she is reminded to buy milk. This patent also discusses route planning between multiple stops, as well as a business-locating function similar to that described in the '699 patent.

It will thus be appreciated that it is difficult for a person to obtain information about their surroundings without the benefit of knowing their exact position. It is also difficult for a person to appreciate the full extent of their surroundings and objects and/or events that are located at some position relative to their surroundings.

SUMMARY

In an effort to address the aforementioned problems, the embodiments of the invention strive to provide an apparatus and methods whereby an individual is able to readily obtain location-centric information about a specific physical location via a wireless device. The wireless device may include systems for determining the location of the wireless device. For example, the wireless device may include a GPS transceiver. Additionally, this location-centric information may include information that is streamed to the user in real-time and pertains to currently occurring events in or near the location of the user. As used herein, location-centric information may include information about the current state of affairs at or around the location of the wireless device. Furthermore, the location-centric information may include information about a future occurrence at or around the location. For example, location-centric information about a future occurrence may include the fact that there will be a concert at the particular location tomorrow, or that there is a severe thunderstorm approaching and will be passing though the area in the near future. Location-centric information may also include information about the history of a particular location. Generally, any type of information about a particular location may be retrieved from the database of location-centric information based on a location of the electronic device.

One embodiment of the invention may use a predefined base grid as a frame of reference for determining location and for retrieving location-centric information based on the location of an electronic device. For example, the base grid may be a geocoded base grid utilizing geocode information in association with the location-centric information stored in a database. The base grid may include a number of volumes. These volumes may define locations within the base grid.

Other objects, advantages and features associated with the embodiments of the invention will become more readily apparent to those skilled in the art from the following detailed description. As will be realized, the invention is capable of other and different embodiments and its several details are capable of modification in various aspects, all without departing from the invention. Accordingly, the drawings and the description are to be regarded as illustrative in nature, and not limitative.

DETAILED DESCRIPTION

Figure 1:
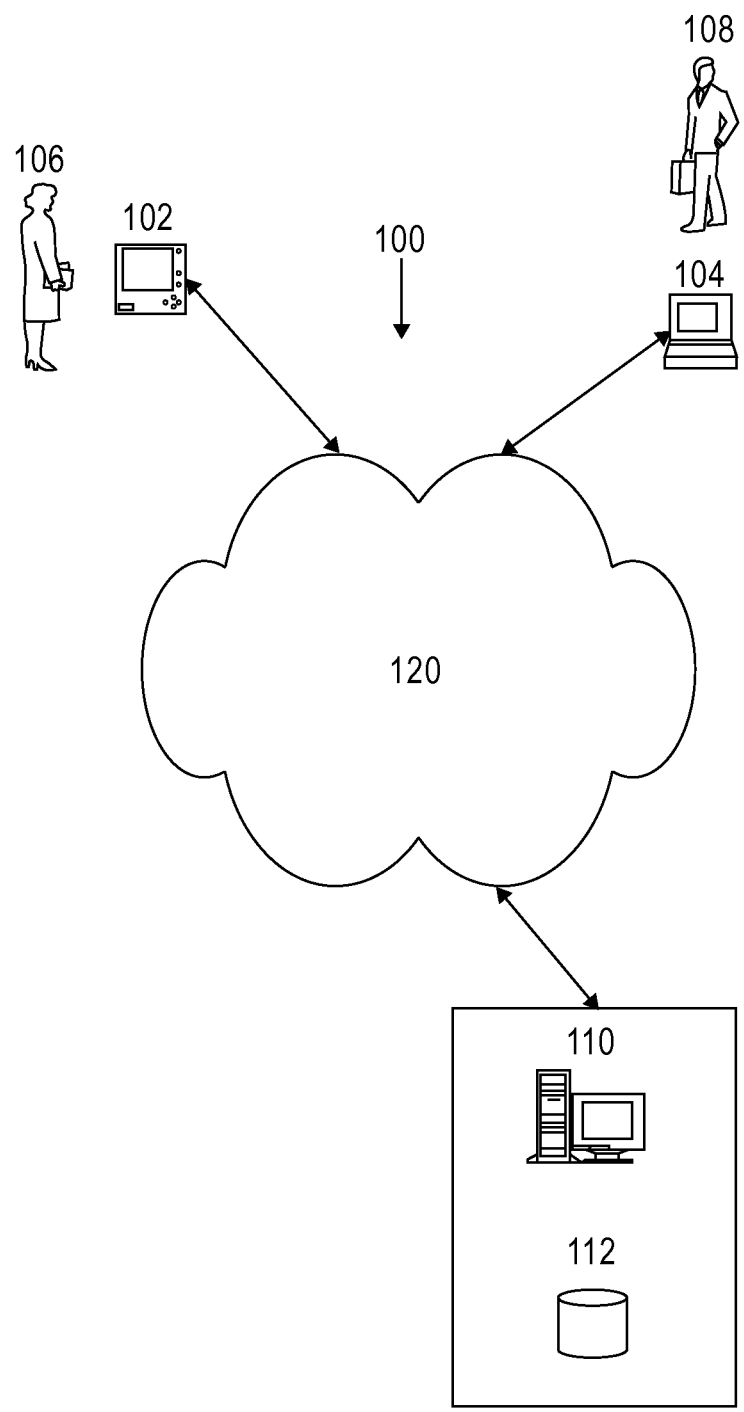
FIG. 1 is a schematic of an information retrieval system in accordance with one embodiment of the invention.
Figure 2:
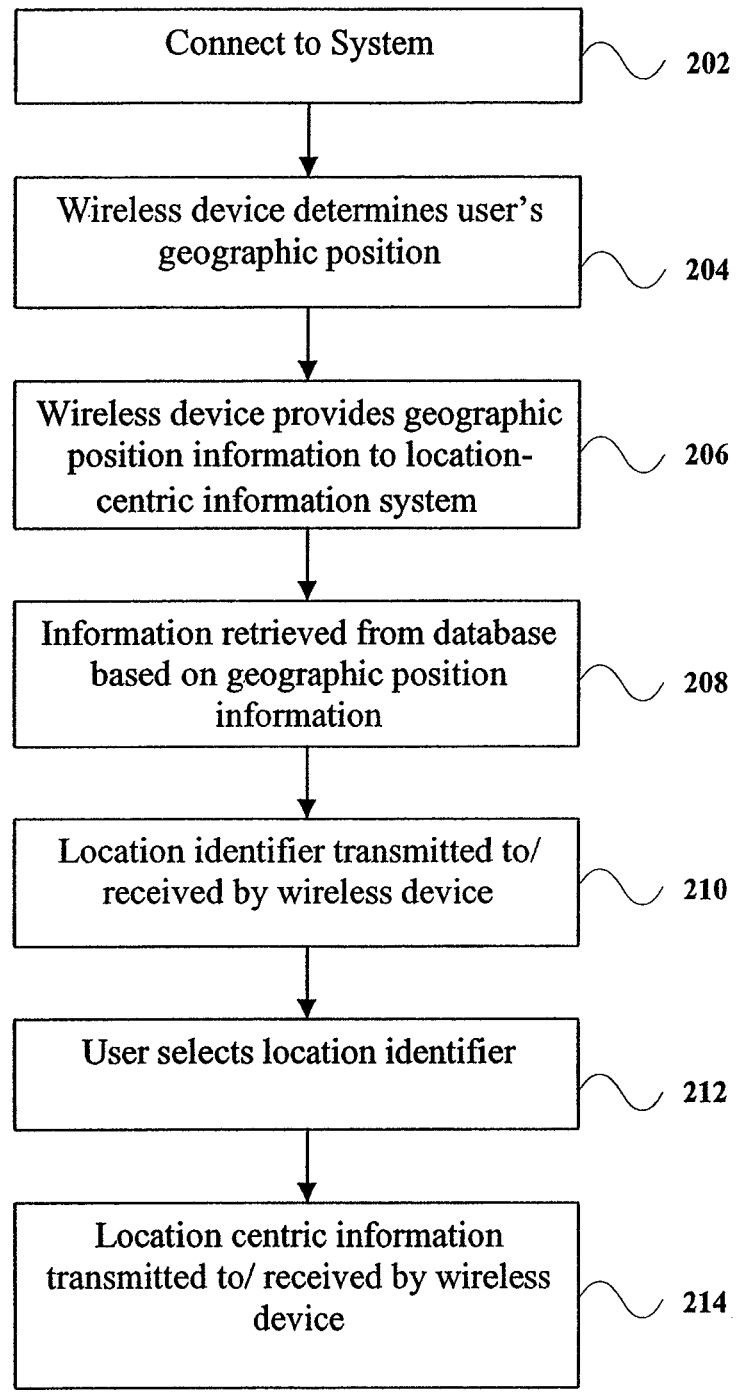
FIG. 2 is a flow diagram illustrating one embodiment of a method according to the invention.

FIG. 1 illustrates one embodiment of an information retrieval system 100 suitable for implementing the features of the invention, and FIG. 2 illustrates a flow chart of an exemplary method of the invention. System 100 includes one or more wireless devices 102 and may also include a computer 104 and a location-centric information system 110 that includes an information database 112. The location-centric information may include information about what is occurring at the location at the point in time that the database is queried. For example, this database may be updated on a daily basis, or may be updated in real-time via a network. Users 106, 108 may retrieve position-based location-centric information from location-centric information system 110 over a network 120 for use with devices 102, 104.

In one embodiment, wireless device 102 is a hand-held electronic device including a global positioning system (GPS) locator whose location can be pinpointed using known means. In another embodiment, CDMA cellular positioning technology, such as that available from QUALCOMM, may be incorporated in device 102. In a further embodiment, wireless device 102 may include a cellular telephone capable of receiving and displaying non-voice data and whose location can be pinpointed using known means.

In an alternative embodiment, the wireless device may include a transceiver, the transceiver being configured to transmit a signal to determine a geographical location of a point remote from the location of the electronic device 102. The transceiver may then receive information from the remote location that identifies that remote location to the electronic device. Location-centric information about that particular location may then be obtained at the device 102, even though the device 102 is located at a point displaced from the remote location. This may be implemented using RFID (radio-frequency ID tags) and an RFID sensor and transmitter on the device 102; using bar codes (using a laser emitter and an optical sensor); or may be radar generated. In a radar generated embodiment, the device 102 may emit a signal in a particular direction. That signal may reflect from a structure located remotely from the device 102. Based on the time of the return signal, the distance to that remote point may be determined. The device 102 may be configured to perform a mathematical calculation knowing the speed of the radar signal (approximated as the speed of light in most cases), the difference in time transmitted and the time received at the device to determine the distance to the target item. Having this distance information and knowing the compass direction at which the signal was emitted (e.g., 0°, or due north) the device may query the database based on the remote location.

In addition to the aforementioned embodiments, device 102 may also be a network hybrid device. The types of location methods for use in the invention may comprise EOA, Time Difference of Arrival (TDOA), Time of Arrival (TOA), GPS cell ID, and network-assisted GPS systems as well as others. While geographic position information may be provided to location-centric information system 110 from wireless device 102, it is also possible for location-centric information system 110 to independently determine the position of wireless device 102. Wireless device 102 may include an automobile-based device that incorporates the telematics principles.

Wireless device 102 and computer 104 are each operable by a user 106, 108 and each include a user input/output, a display, and a memory. Wireless device 102, and computer 104 are each configured to run software to retrieve and view location-centric information from database 112 of location-centric information system 110 over network 120. As described below, a user interface rendered on wireless device 102 and computer 104 also enables users 106, 108 to carry out various activities, including, for example, information retrieval, appointment scheduling, data searches, etc. Hence, wireless device 102 and computer 104 are devices by which each user 106, 108 can download and/or view information related to a landmark at which they are located and retrieve and view the information regarding the particular landmark.

For purposes of the present application, the term "landmark" may be used to refer to any (1) physical structure such as a residence, apartment, apartment building, detached home, partially detached home, townhouse, condominium, co-op, building, etc.; (2) natural feature such as a body of water, glacier, canyon, cave, mountain, mountain range, etc.; (3) historical feature such as a monument, memorial, statue, battle field, historic location, park, trail, etc.; or (4) commercial feature such as a stadium, arena, school, shopping mall, strip mall, store, grocery store, parking garage, airport, hotel, inn, hostel, camp ground, car dealer, car rental establishment, hospital, etc. Furthermore, while the description may describe particular embodiments as being used to identify location-centric information associated with a particular landmark, one of skill in the art will appreciate that the particular embodiments described herein are equally applicable to particular environments, for example, a rain forest, a river and/or an island. In another alternative embodiment, the information may not pertain to a location or an environment, but may pertain to a live event, such as a power outage, a flood, a hurricane, or a tornado.

Suitable implementations of wireless devices 102 and computer 104 include devices such as laptop computers, wireless telephones, portable workstations, personal data assistants ("PDA's"), pagers, and various other portable electronic communication devices capable of carrying out similar activities. Where wireless device 102 is a PDA or similar device, user 106 may utilize conventional methods to provide input. Where wireless device 102 is an automobile-based device, user 106 may utilize manual methods or voice commands to provide input to wireless device 102. In such a situation, wireless device 102 is equipped with voice-recognition software known in the art.

Network 120 may be any form of interconnecting network including an intranet, such as a local or wide area network, or an extranet, such as the World Wide Web or the Internet. Network 120 can be physically implemented on a wireless or wired network, on leased or dedicated lines, including a virtual private network (VPN). Communications network 120 can be any type of communications network, such that computer 104 and wireless device 102, whether a hand-held electronic device or a cellular telephone, can both access location-centric information system 110 to retrieve and view information from database 112. The invention may be used in conjunction with a wireless operating system such as the Wireless Application Protocol (WAP).

In one embodiment, system 100 is based on the WINDOWS operating system. In another embodiment, system 100 is based on the PALM operating system. In yet a further embodiment, system 100 is based on a UNIX operating system. System 100 may also be internet-based and generate web-browser and web page data, such as HTML, JavaScript, Java applets, Java 2 Micro Edition (J2ME), Binary Runtime Environment for Wireless (Brew), Wireless Application Protocol (WAP), etc.

While the invention may be used in conjunction with any of the categories of landmarks described above, it may be used in a real estate context. Many of the examples illustrated herein relate to use of the invention with respect to real estate. However, the invention is applicable to any of the landmarks described above.

Database 112 may be an ODBC-compliant database, such that it is accessible via a variety of database programs. Database 112 may include a variety of different location-centric information regarding each landmark stored therein. Database 112 may also include textual data and a voice description of a landmark at a particular location, such that this information can be retrieved by either wireless device 102 or computer 104. Database 112 may also include photographs of the property, floor plans of any buildings on the property (in two-dimensional and three-dimensional views), animation, or video footage of the property, representing a virtual walk-through of the property. Not only may the database include information about the terrestrial property, but the database may include information about subterranean features, such as tunnels, mines, and manholes. The floor plans may include exit/egress plans for buildings, electrical, ventilation, gas, or plumbing schematics. The information may also include occupancy type and total capacity of a particular property. The accessibility of these graphical elements of database 112 may be dependent upon the display capabilities of the receiving device. In one embodiment of the invention, database 112 may be used in connection with a multiple listing service (MLS) to provide information on as large a number of properties as possible.

Accordingly, although location-centric information system 110 may store information related to real estate, it may store other information as well. The information may be stored in a single database 112 or multiple databases. For example, location-centric information system 110 may store any combination of information regarding any of the following in any number of databases 112. Location-centric information system 110 may include information regarding single family homes, condominiums, town houses, apartments, historic buildings, monuments, memorials, parks, statues, bodies of water, mountain ranges, canyons, trails, electrical lines, oil pipelines, manhole covers, etc. The location-centric information system 110 may further include information regarding office buildings, including directories, occupants/tenants, floor plans, lease data/availability, specifications, services offered in the building, etc. Additional information including seating availability in a restaurant, the location of a manhole cover, the status of a power grid, and exit/egress plans may also be made available using the methods and systems of the invention. Location-centric information system 110 may further include information regarding business locations such as retail outlets, and restaurants, including information about services offered, menus, prices, etc. Location-centric information system 110 may also include information regarding airports, including maps, flight information, parking information, retail information, etc. Location-centric information system 110 may also include information regarding hotels including room availability, rates, historical information, directories, etc. Location-centric information system 110 may include information related to shopping malls including directory information, maps, operating hours, parking information, etc. Location-centric information system 110 may also include information regarding sports arenas such as seating diagrams, concessions available, services offered, etc. Location-centric information system 110 may include any information about any location that may be provided by a representative of the particular location to be included in database 112 or that may be independently entered into database 112 by a party not affiliated with the particular location.

A user of the location-centric information system 110 can acquire virtually any information about their surroundings. To accomplish this task, the system preferably includes some location-determining communications device 102 as described above, such as a cell phone, PDA, etc. and an associated method of determining position such as, GPS, triangulation, or long-range sensor or scanning device which can detect an object. There may also be some way to transmit this information to a computer and/or communication network such as a wireless or Internet enabled connection as described above. There may be a database 112 or distributed database storage network that handles both base data and spatial information as well as the real time input from the transmission of new data. Finally, there can be a method to automatically update and order data, as well as handle real-time updates of the data.

A method of real-time updating of the database containing the location-centric information may include updating the database using data streamed from a third-party supplier of information. For example, information from the National Weather Service may be streamed into the database and classified according to geographic location. This information may be streamed via a network such as the internet, or alternatively may be streamed via other closed circuit or wireless communications network. Alternatively, information from the Office of Homeland Security may be sent to the database over the network. For example, location-centric information about an imminent terrorist threat at or proximate to the location of a user may be sent to the user of the electronic device.

The system utilizes location detection information to communicate with database 112. In addition to sending location information to the database, information identifying the current time may be sent to the database. This information may allow a user to determine what is occurring in the particular location at that point in time. When combined with updated spatial information, a spatial information grid is formed that can be accessed via device 102 or a computer network. Tapping into this information grid allows a user to rapidly find or obtain information about living or inanimate objects—stationary or moving—on a planet's surface, underground, in its atmosphere or within its space/gravitational pull.

| Characteristics of an Object: Living or inanimate; stationary or moving | | |
|---|---|---|
| | Stationary Objects* | Moving Objects |
| Living Objects | Tree | person, animal |
| Inanimate Objects | house, mountain, utility pipe | car, satellite, tornado |

*Some of these objects can change characteristics. A stationary item can be moved i.e. a computer or bomb; or a living object can be killed, for example.

In the location-centric information system 110, an object can be located in a number of different ways as described above. Once located, the object can be identified by matching it to information in the spatial information grid database. Information about the object, the object's surroundings, and associated information can be determined from the database 112. This spatial information grid database is previously populated with base data and is programmed to accept real time inputs and order this data to maintain an expanding seamless robust grid. These real-time inputs may be processed through algorithms that reorder the data and properly associate the data with a particular location within the grid. Through this means, a "self healing grid" may be created. This concept of a self healing grid is based on the continuously expanding amount of information that may be received about the locations and particular volumes within the grid.

For example, a grid may be thought of in either two or three dimensions. This example focuses on a three-dimensional grid. The grid may define a total volume of a particular size. The size of the grid may be an office building, a museum, a neighborhood, a city, a nation, or any other size. This grid may include information about latitude, longitude and elevation or altitude, making the location information three-dimensional. In a grid having only one item of location centric information, the grid includes only one volume. For example, defining a grid based on the state of California, a user may obtain information that states "you are in the state of California." This being the only location-centric information in the base grid. More information may then be added to the grid. For example, the names of each of the cities, towns, villages, etc may be included in the database. The grid can then be defined by a number of volumes of differing sizes. As a user travels from city to city, they may be informed that they are in the city of San Diego, or Oakland, or San Francisco. Additional information may then be added to the database associated with each street address in the particular city in the state of California. Even more information may then be added about the historical events that occurred at some of or all of the addresses in California.

Each time more information is added to the database, the grid becomes more seamless. Information can then be updated in real-time making the grid not only seamless in the spatial sense, but also in a temporal sense. Location-centric information may include information that is streamed to the user in real-time and pertains to currently occurring events at or near the location of the user. As used herein, location-centric information may include information about the current state of affairs at or around the location of the wireless device. Furthermore, the location-centric information may include information about a future occurrence at or around the location. For example, location-centric information about a future occurrence may include the fact that there will be a concert at the particular location tomorrow, or that there is a severe thunderstorm approaching and will be passing though the area in the near future. Generally, any type of information about a particular location may be retrieved from the database of location-centric information based on a location of the electronic device.

A grid that is both spatially and temporally seamless may be highly desirable as it allows the user of an electronic device to query the database containing the information to receive information about the current conditions of any particular location they wish. For example, a user may receive information about the wait time at their favorite restaurant, or a group of restaurants in a particular geographic location.

The system becomes "intelligent" by using the position of an object and updating the spatial information grid database in real time. The system, based on an identified object, will know what the object is by querying the database and rapidly returning relevant environmental/surroundings information based on the transmitted data. This return of information to the database automatically fills in any "gaps" in the database about a particular location, thereby making the system an intuitive one.

For example, in a wireless rendition a person may be holding a wireless device, the system uses that device to get the location of the user, and allows the user to access information about the world around him, anywhere, as the spatial information grid database has already been seeded and programmed.

In another scenario, that same user, working at some predetermined checkpoint, scans a person passing through the checkpoint with a fingerprint or DNA scanner, which automatically checks for information from a secure national security system. The person is identified and can be tracked as they pass other checkpoints.

Likewise bombs or tornadoes can be tracked from their unique emission signatures. Real time information can be received and entered into the database and plotted as it moves across the spatial grid. Once this information has been associated with the proper geographic location or locations, the information may be obtained by a user of the electronic device. The user may receive information about a projected path of a storm, for example, using the system and methods of the invention. This information may be based on a time-rate of change of a position of both the user and the storm (i.e., but knowing the velocity (a vector quantity, having both magnitude and direction) of the user and, for example, a storm, the system may inform a user that they are heading into a potentially dangerous situation.

This may be accomplished by using a wireless sensor configured to detect certain environmental characteristics (e.g., the presence of an specific individual, environmental temperature, or the presence of a fire or harmful chemical or biological substance) and then upload this information to the database in real time. For example, a fire sensor may be used to determine that there is a fire in a location. If the user is in, or proximate to, that particular location, information relevant to the fire may be reported to the user. More particularly, forest fires may be reported to an individual in a national, state, or municipal park based on the detected presence of a fire. Other factors associated with the fire may also be relayed to the user. For example, the user may be informed of the direction of the spread of the fire, and the rate of the spread of the fire. Such information may permit the user to escape a dangerous situation. This information may also be used to project or forecast the direction of spread of the fire based on wind speed and the availability of fuel for the fire. As an alternative, or in addition to this type of information, the user may also receive information about past fires that occurred in the location.

To create the system as described, the master or base grid database, which can be multi-point and distributed, is populated with relevant data of multiple forms/formats. The information embedded in the database includes location and description tags/codes or signatures. In addition to the location description information, the information entered into the database may also include a time or time/date stamp, which can allow a user to access both location-centric and time-based information from the database based on their location. The database includes an automated feedback mechanism to enable the database to receive real time updates from multiple computers, electronic and/or communication devices and networks which will contain information with location and or signatures which need to be matched to data and files in the based grid database to provide relevant information returns. Thus, the database creates a seamless grid of information that is tied to the location-centric information and ultimately provided in real time to the user. In addition to being seamless with respect to spatial information, the database may be created so that the database is temporally seamless. Temporally seamless use of the database may be established by using all available historic information in conjunction with information that has been added to the database in real-time to identify the current state of affairs of a particular location, and may also include all determinable information about future affairs. For example, if the 2012 Olympics will held at a particular location, a user in the year 2003 may find this future information out using a temporally seamless grid according to an aspect of the invention.

The base grid may be defined using geocodes. A geocode is an identifier assigned to both a map feature and a data record containing attributes that describe the entity represented by the map feature. More particularly, geocoding is a process of matching records in two databases. The first database is an address database (without map position information) and the second database includes a reference street map or other address dictionary (with known map position information). After the information in these two types of databases has been correlated, the database information carries its own position information and can be mapped without the reference street map or address dictionary.

Geocodes may be constructed to any level of specificity. For example, geocoding may be done by zip code, by street, census tract, or by address. Various coordinate systems may be used to geocode. For example traditional latitude and longitude systems may be used. Alternatively, systems employing Universal Transverse Mercator ("UTM") may be used.

Figure 20:
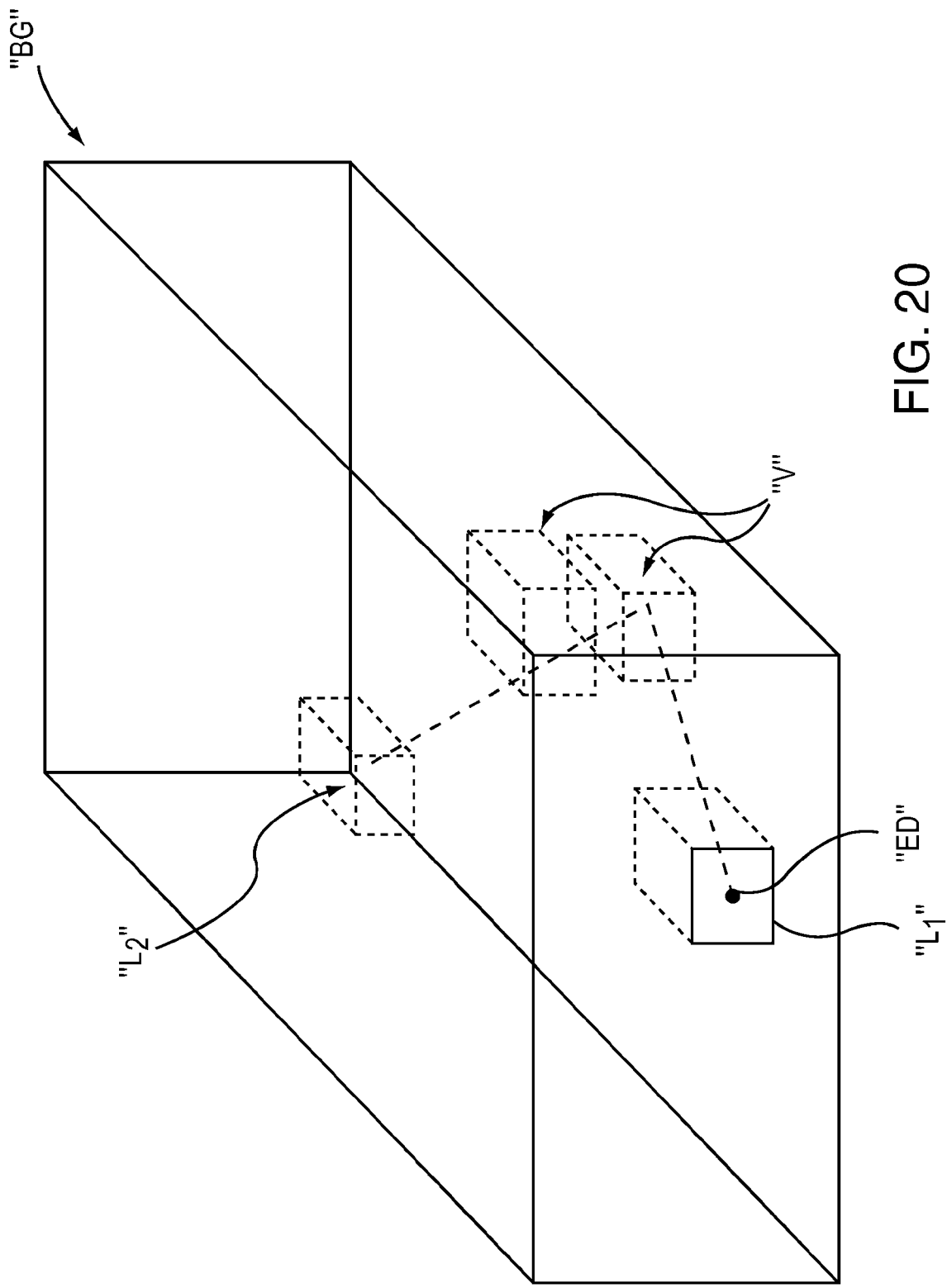
FIG. 20 is an exemplary base grid according to an aspect of the invention.

The grid may be seamless over a particular geographic location (i.e., "spatially seamless"). This means that the database may have information associated with each location throughout the grid. With reference to FIG. 20, as an electronic device, "ED" travels from one location, "$L_1$," to a second location, "$L_2$," other volumes, "V" within the base grid may be passed through. These volumes will all have information associated with them, so as a user moves though each of the volumes between a first location, "$L_1$" and a second location, "$L_2$," information may be streamed to the user via the electronic device, "ED," describing each area that the user is passing through. Additional aspects of FIG. 20 are described in further detail below.

Additionally, the invention includes a method of creating a seamless database including obtaining information from a number of different sources associated with a number of locations. This information may, but need not, define a seamless grid. After the base grid is defined, information may be obtained to supply data for locations within the base grid that have no information associated with those locations. Take for example a location that has no information associated with it in the database. A sensor may be placed at that location and may be used to update the database to provide location-centric information associated with that location. A sensor need not be used in this instance, and rather information may originate from a third party and concern various fixtures installed in that location, for example a particular store or a billboard.

As the database is filled for a group of adjoining volumes within the grid, the adjoining volumes begin to define a spatially seamless grid. This method may be repeated until a completely spatially seamless grid has been formed for a particular predetermined base grid. Information may also be added and time-coded such that the temporally-seamless grid discussed above is formed. Alternatively, the database may include only temporally seamless information. The term "seamless grid" (meaning either or both of temporally seamless and spatially seamless) is understood to account for the rapidly evolving state of information available from all sources. However, in this respect, the database is self-healing as it is updated in real-time, so as the database receives more information, the grid becomes ever-more seamless. This repetitive process may never be complete. However, one of skill in the art will realize that the term "seamless" is relative to the information retrieval capacity and storage capacity of the system, bandwidth of the network links, speed of the processors, bandwidth of the wireless satellite uplink, availability of information, among other factors. However, the database may be made as seamless as possible by obtaining diverse information from a number of sources spread throughout a particular base grid.

The master database is embedded with base data and content in flat, 2D and 3D, voice, audio and video form. A method to rapidly acquire real time information to populate and grow the grid is provided. Base data could include property information, natural and built infrastructure data such as geographical information systems (GIS), building plans and Computer Aided Design (CAD) files, navigational maps, natural resource surveys, socio-economic data, DNA and other life signatures, corporate data, weather data, military data, natural disaster (either current or past) data, man made disaster data, homeland security data, census data, or location-centric evacuation data. This data may be static or updated in real-time via a network.

The system is developed to intake, scrub, correct, order, and store data, into a searchable format, and accept, categorize, and order real time data that updates the grid. The data may also be date stamped, time stamped, or date and time stamped. This may allow the system to create a more seamless database.

Each piece or field of data should also be ordered and coded, so it can be located or tracked within the database and when the database receives real time queries from a computer or communication system relaying a query which may include the location of the query. Types of location coding or "tags" include coordinates such as latitude and longitude, addresses, parcel ID's, and other geocodes. The coding may also include date and/or time stamps. Thus, the database may be queried on a combination of both geographic location data and temporal data. Types of signatures include DNA or other molecular identifying code or make-up of a living or inanimate object which could also include embedded plasmas, ions, chips, nano-barcode structures, etc. with the specific purpose of identifying items such as bomb making material or radiation and/or tracking and identifying an object or person.

When a user queries the spatial information grid database through a computer or wireless device attached to a network, real time signatures, geocodes or tags related to the query are sent with the query to the spatial information grid database, which matches real time identifiers with the database records.

By creating such a spatial information grid, information can be readily obtained about any point within the grid from any other point within the grid (on a planet surface, underground, in its atmosphere or within its space/gravitational pull).

A person with a cell phone, a location chip in his clothing or embedded in their body, can receive a stream of information about their surroundings/environment as they move through the space defined by the grid. For example, the person will know what building is in front of them, where is the eye of the hurricane in relation to their position, where the endangered birch tree is relative to their location, etc. In another embodiment of the invention, a user may receive information about how a particular environmental event (e.g., a weather pattern) relates to their present location.

Once the user's position is obtained form a location detection system as described above, the position signal is sent to the spatial information grid database, which locks onto similar data that matches the location. Data about the surroundings is then rapidly returned to the user. This information may be up-to-the-minute information about property, amusement park lines, restaurant seating availability and specials, etc. Additionally, the information may be information that is projected into the future, (i.e., the path of an on-going natural or man-made occurrence (e.g., a chemical spill, a cloud of noxious or poisonous gasses, a volcano eruption, etc.). Additionally, traffic congestion information may also be conveyed to the user.

FIG. 20 illustrates an exemplary base grid according to an embodiment of the invention. The base grid, "BG" may contain a multitude of volumes, "V." These volumes define the base grid. While the volumes are shown as being equal in size, they need not be. Additionally, while the volumes depicted are symmetrical, the volumes may be any shape or size. A location within the base grid is illustrated as "$L_1$." The location "$L_1$" is a volume "V" with an electronic device, "ED" contained therein. Therefore, the location is not necessarily fixed within the base grid and will change as a user of the electronic device moves from volume to volume (or for example from $L_1$ to $L_2$) within the base grid. As the electronic device will be located in only one location at a time, the information received by the electronic device will be associated with the particular volume that the electronic device, "ED" is located in.

This system can be accessed from any communication device or computer, and the database may be queried by typing data into an electronic device, via audio, or interactively selecting particular data fields or hyperlinks to data fields from a video or map, for example.

Any one of, or combinations of, the above-described information stored by database 112 may be communicated to wireless device 102, and computer 104 over network 120 in the manner described in greater detail below.

The following description of the operation of system 100 includes the function and interaction of user 106 and wireless device 102 with the remainder of system 100 illustrated in FIG. 1. However, it is to be understood that the following description is equally applicable to user 108 and computer 104, and multiple other users and wireless devices, or portable computers not illustrated in FIG. 1.

One method of the invention will now be described in reference to FIG. 2. As will be apparent, the operations illustrated in FIG. 2 need not occur in the illustrated order. As illustrated by FIG. 2, at an operation 202, wireless device 102 may be connected to location-centric information system 110 via network 120 according to known methods. At an operation 204, the location of the user 106 (i.e., geographic position, latitude/longitude) is determined using one of the methods described above. At an operation 206, wireless device 102 provides the geographic position information to location-centric information system 110.

In an operation 208, location-centric information system 110 may retrieve location-centric information from database 112 based on the geographic position information provided by wireless device 102. In one embodiment, location-centric information system 110 also retrieves a location identifier from database 112. A location identifier is an indicator associated with a particular landmark. The location identifier is representative of a landmark located at the geographic position associated with wireless device 102 and may take any of a variety of forms. For example, a location identifier may be a street address of a residential unit (e.g., house, condominium, etc.) at which user 106 is located. Alternatively, the location identifier may be a video image such as a picture or other graphical representation of the landmark at which user 106 is located. Further, the location identifier may be a video or audio representation of the landmark at which user 106 is located. Location-centric information is that information related to the location identifier. The location-centric information is that information described above as being stored in database 112 and may also include information available over network 120 that is related to a location identifier such as detailed residential unit information including house description, sale price, etc.

Figure 3:
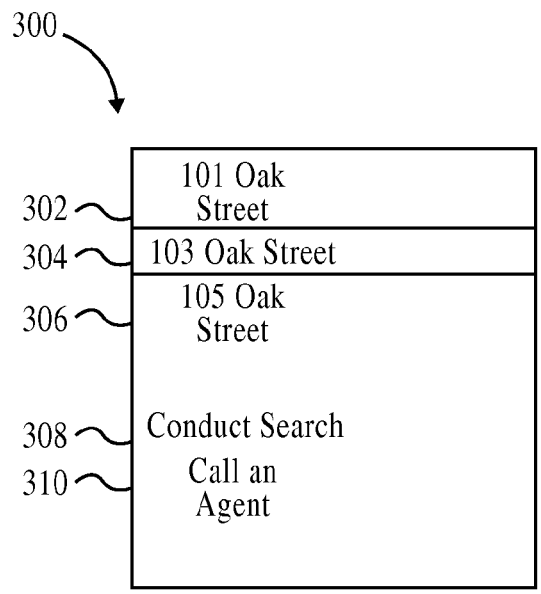
FIG. 3 is an example of a location identifier display produced on a wireless device of the system illustrated in FIG. 1.

In an operation 210, a location identifier is transmitted to, and ultimately received by, wireless device 102. Alternatively, a plurality of location identifiers may be transmitted to wireless device 102. FIGS. 3-13 illustrate exemplary displays that may be viewed by user 106 accessing system 100 of the invention in the search for a particular piece of real estate. As illustrated in FIG. 3, wireless device 102 presents a location identifier display 300 for viewing by user 106. Location identifier display 300 may be an interactive display viewed by user 106 when user 106 desires to import location-centric information to wireless device 102 from location-centric information system 110. Hence, wireless device 102 may include computer executable software code stored on a computer readable medium of wireless device 102 for prompting user 106 to select the appropriate location identifier to retrieve the appropriate location-centric information from location-centric information system 110 to wireless device 102. User 106 can interact with the display using a keyboard, a touch screen, a microphone, etc. In one embodiment, location identifier display 300 presents interactive links 302, 304, 306, 308, 310 that user 106 may use to import or retrieve the desired location-centric information from location-centric information system 110, or perform some other function using location-centric information system 110 as will be described. Interactive links 302, 304, 306, 308, 310 may include a location identifier.

Other interactive links may be provided for various functions such as searching database 112 as will be described below. For example, as illustrated in FIG. 3, location identifier display 300 also includes a conduct search icon 308, which permits user 106 to perform a search of database 112 and a "Call Agent" icon 310 which allows user 106 to contact a person with greater knowledge of the particular location.

In the embodiment illustrated in FIG. 3, interactive links 302, 304, 306 include location identifiers in the form of street addresses. In this embodiment, a plurality of location identifiers 302, 304, 306 may be included when the location-centric information system 110 is unable to attribute the geographic position of wireless device 102 with a particular landmark. This may occur, for example, when a geographic position corresponds to several entries in database 112. In such a case, location-centric information system 110 provides the possible location identifiers corresponding to the several entries within a predetermined or random radius of the geographic position of wireless device 102. For example, if user 106 is located on a street in front of several houses, location-centric information system 110 may provide location identifiers indicating the street address of the houses in the general vicinity. More specifically, as illustrated in FIG. 3, when user 106 is located, for example, in front of "103 Oak Street" location-centric information system 110 may provide location identifiers of "101 Oak Street," "103 Oak Street," and "105 Oak Street." As mentioned above, the location identifiers may also take the form of graphic images of the houses provided wireless device 102 is capable of providing such a display.

In another example, if user 106 is located in the Grand Canyon and desires to retrieve information about the Canyon, the location identifiers that may be provided may relate to the direction user 106 is facing (e.g., North, South, West, East). When user 106 selects the appropriate location identifier, location-centric information may be provided based on the direction user 106 is facing.

Geographic position information of wireless device 102 may be attributed to a distinct landmark within location-centric information system 110. In that case, location-centric information system 110 may only transmit to wireless device 102 a single location identifier. In such an embodiment, user 106 would then select the single location identifier. In another embodiment, location-centric information system 110 may provide a plurality of location identifiers 302, 304, 306, but may highlight the location identifier that is attributed to the distinct landmark as shown at 304. In this manner, user 106 may actively choose from alternative location identifiers 302, 306. In a further embodiment, where a precise location is provided to location-centric information system 110 from wireless device 102, location-centric information system 110 may transmit to wireless device 102 only location-centric information relevant to the particular location without user 106 ever actively selecting the location identifier. In such a situation, user 106 may be passively selecting the appropriate location identifier by virtue of the position of user 106 with respect to the particular location.

When presented with a location identifier 302, 304, 306, in an operation 212, user 106 selects the appropriate location identifier. Upon selecting the location identifier, location-centric information system 110 transmits location-centric information related to the selected location identifier to wireless device 102. In those embodiments where a location identifier is transmitted, location-centric information system 110 transmits location-centric information to wireless device 102 when the distinct landmark is identified.

Figure 4:
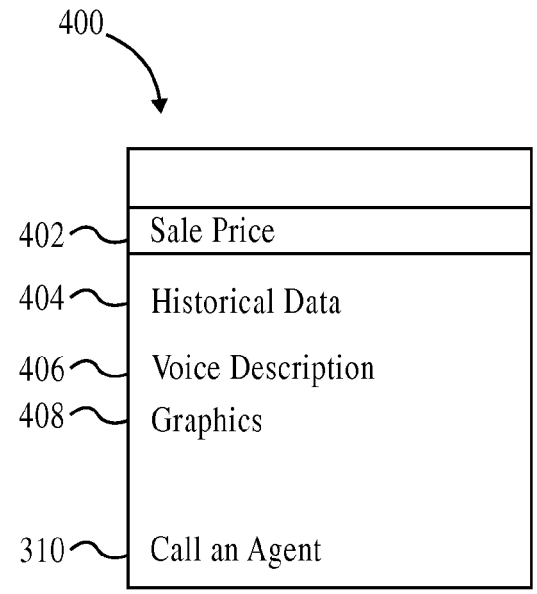
FIG. 4 is an example of an information search display produced on a wireless device of the system illustrated in FIG. 1.

When wireless device 102 receives the location-centric information in an operation 214, user 106 is able to manipulate the location-centric information to obtain location-centric information relevant to user 106. For example, FIG. 4 illustrates an example of a location-centric information search display 400 viewed by user 106 upon receiving location-centric information. Location-centric information search display 400 may include a menu or list of icons with selections 402, 404, 406, 408, 310 for user 106 to choose from to obtain more narrowly tailored or focused information about the particular place at which they are located. In the illustrated embodiment of a user accessing system 110 for a real estate transaction, such information may include sale price 402, historical data 404, voice description 406, and graphics 408. The list can be expanded beyond these four options as would be apparent. Selecting "sale price" item 402 may present to user 106 the current sale price for the property, as will be discussed below. Choosing "historical data" item 404 may present user 106 with the historical sale prices for the property in order to assess the property's appreciation over time. Selecting "voice description" option 406 may play back a spoken description of the property. Finally, selecting "graphics" item 408 may display any available graphics (e.g., floor plans, exterior or interior views, or walk-throughs) relating to the property.

Figure 5:
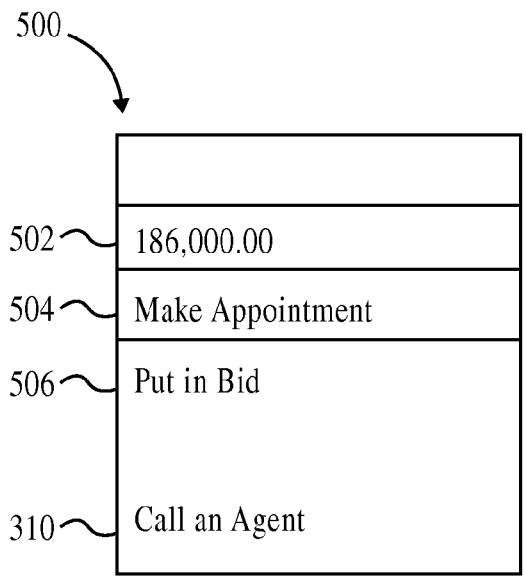
FIG. 5 is an example of a data retrieval display produced on a wireless device of the system illustrated in FIG. 1.
Figure 6:
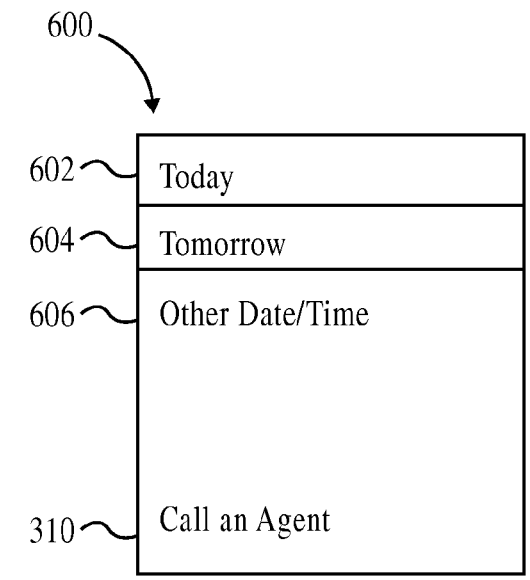
FIG. 6 is an example of an appointment display produced on a wireless device of the system illustrated in FIG. 1.

If user 106 selects one of items 402, 404, 406, 408, from search display 400, a data retrieval display 500 may be displayed, an example of which is illustrated in FIG. 5. Data retrieval display 500 can include more detailed information 502 and action icons 504, 506, 310 which enable user 106 to take action based on detailed information 502 regarding the particular location at which user 106 is located. Referring to the illustrated embodiment, when user 106 selects "sale price" icon 402, sale price 502, an option to make an appointment 504 to view the property, and the ability to place a bid 506 on the property may be displayed.

Where user 106 chooses an action icon 504, 506, user 106 may be presented with a display 600 that may allow user 106 to take some action with respect to the property at which user 106 is located. In the illustrated embodiment, assuming user selects "make appointment" item 504, an appointment display 600 is viewed by user 106 as illustrated in FIG. 6. From appointment display 600, user 106 can choose from pre-selected appointment times such as today 602, tomorrow 604, or schedule a different appointment time 606. If user 106 selects "bid" item 506, user 106 will be prompted to enter a bid amount, which will be transmitted back to database 112. In this manner, user 106 is able to interact with database 112.

Figures 7, 8:
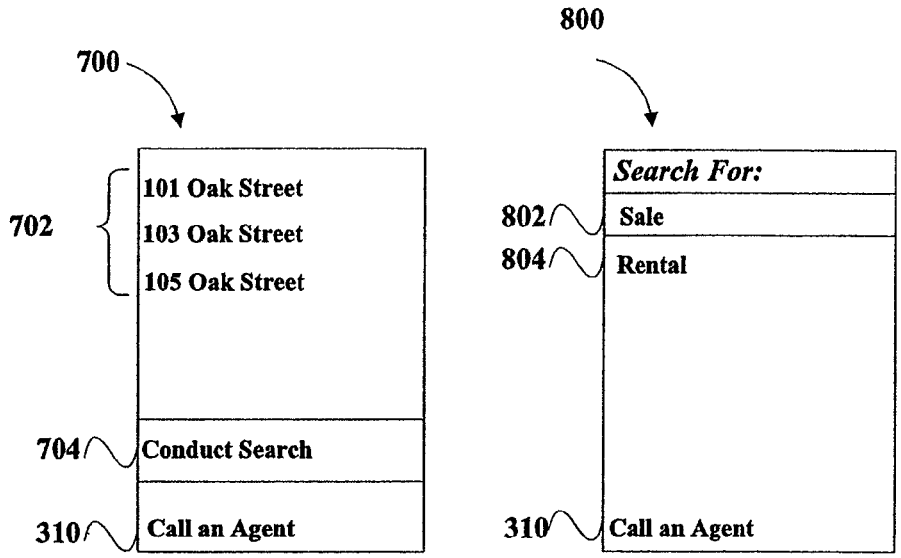
FIG. 7 is an example of a search initiation display produced on a wireless device of the system illustrated in FIG. 1.
FIG. 8 is an example of a search selection display produced on a wireless device of the system illustrated in FIG. 1.

FIGS. 7-12 illustrate various exemplary displays on wireless device 102 hat may be viewed by user 106 when user 106 desires to search for a particular landmark (i.e., building, property, park, body of water, etc.). FIG. 7 illustrates a search initiation display 700 shown after user's 106 location has been determined using one of the methods described above. Search initiation display 700 may be similar to location identifier display 300 illustrated in FIG. 3 provided location identifier display 300 includes a "conduct search" icon 308 as illustrated. Search initiation display 700 allows user 106 to search database 112 for more detailed information as will be described. In the illustrated embodiment of user 106 conducting a real estate transaction, search initiation display 700 includes a list 702 of street addresses of properties adjacent to the particular property in which user 106 is concerned, and a "conduct search" icon 704. If user 106 desires assistance at any time during the search process, user 106 may select call agent item 310, and user 106 will be connected to an operator or recording that may provide additional instruction or information. Such a feature may be available whether user 106 is using wireless device 102 to conduct a real estate transaction or any other type of transaction. Call agent item 310 is accessible from any of the displays described.

Figures 9, 10:
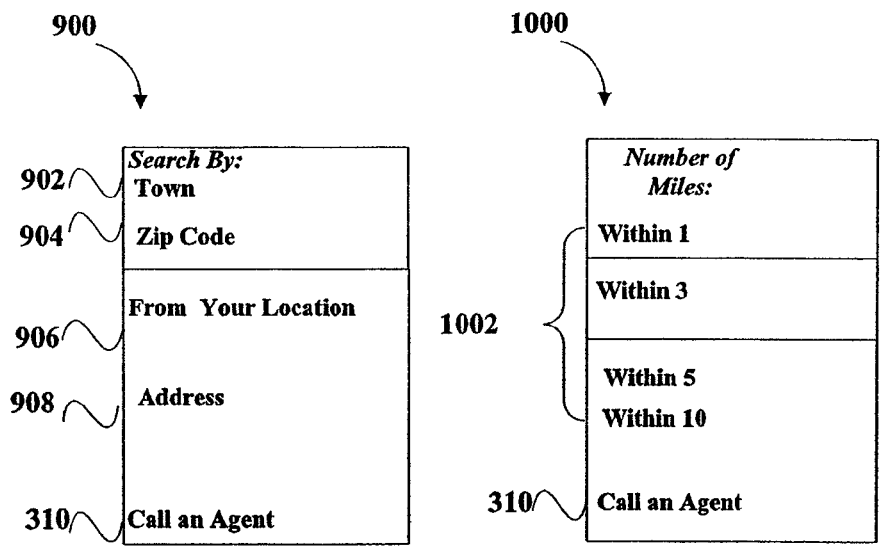
FIG. 9 is an example of a criteria selection display produced on a wireless device of the system illustrated in FIG. 1.
FIG. 10 is an example of a transaction type display produced on a wireless device of the system illustrated in FIG. 1.

User 106 enters the search process after selecting "conduct search" item 704 from search initiation display 700. A search selection display 800, illustrated in FIG. 8, can then viewed by user 106. Search selection display 800 allows user 106 to choose from broad categories of selection criteria. For example, in the illustrated embodiment, where user 106 is interested in real estate, they may be given the option of searching for properties to either rent or buy. User 106 may be presented with selection icons 802, 804 to prompt the database to narrow the search to a particular category. As illustrated in FIG. 9, user 106 may be presented with a criteria selection display 900 that allows user 106 to further define the search criteria within the chosen category based on the chosen selection icon 802, 804 from search selection display 800. Criteria selection display 900 includes search criteria or search options 902, 904, 906, 908. In the illustrated embodiment, criteria selection display 900 includes a menu of search options, including search by town 902, search by zip code 904, search by present location 906, and search by street address 908.

Upon making a selection from criteria selection display 900, user 106 may then be presented with a transaction type display 1000 that allows user 106 to define the specific criteria chosen from criteria selection display 900 by using a selection list 1002. In the illustrated embodiment, assuming that user 106 chooses "search by present location" item 906, a transaction type display 1000 is viewed, from which user 106 can narrow the geographic scope of the search by selecting, for example, a predefined radius 1002.

Once user 106 defines the specific search criteria, user 106 may be presented with a narrow search display 1100, to further narrow the search results within the specific criteria by choosing from a selection list 1102 of narrowing criteria. In the illustrated embodiment, user 106 selects, for example, the price range for the property from a list of price ranges 1102. The list of narrowing criteria may include any criteria that would narrow the search results retrieved. For example, the criteria could include features such as number of bedrooms, number of bathrooms, square footage, location (i.e., near a golf course, near a lake, etc.).

Figures 11, 12:
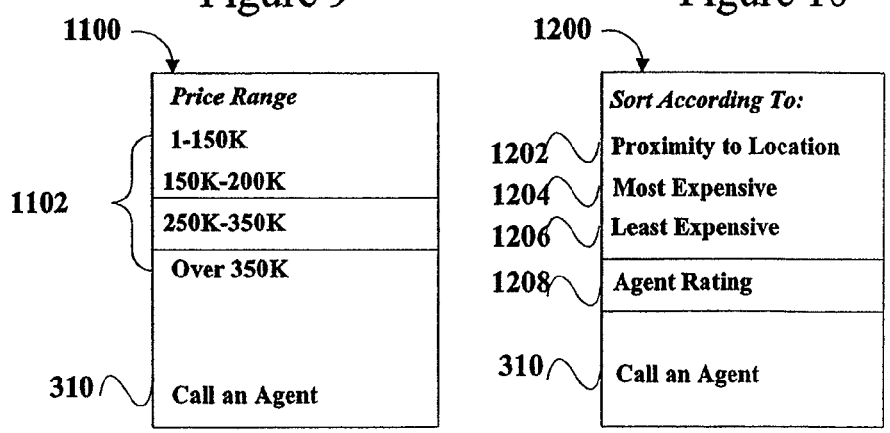
FIG. 11 is an example of a narrow search display produced on a wireless device of the system illustrated in FIG. 1.
FIG. 12 is an example of a data presentation display produced on a wireless device of the system illustrated in FIG. 1.

FIG. 12 illustrates a data presentation display 1200 that permits user 106 to select the order in which the search results are to be presented. User 106 may be given options 1202, 1204, 1206, 1208 to choose from. In the illustrated embodiment, the results can be sorted by proximity to user's 106 present location 1202, in descending order starting with the most expensive property 1204, in ascending order beginning with the least expensive property 1206, and by property rating 1208. The property rating 1208 is a proprietary rating determined on the basis of the condition of the property, the location of the property, and the list price of the property.

There may be an infinite number of displays and search criteria screens that allow user 106 to narrow or expand their search for a particular landmark. The invention is not limited to the number of search screens illustrated and disclosed above. For example, in another embodiment of the invention, there may be a single search screen without the ability to define search criteria. In another embodiment, user 106 may be able to decide to what extent they desire to narrow the search and execute the search prior to viewing all of the criteria narrowing search screens described above.

The embodiments described above allow user 106 to retrieve information about a particular landmark near which they are located. If a person is looking for a house, apartment, or other property to rent or purchase, the property near which they are located may not be for sale or rent. But the person may like some of the features of the home or the general design. In that case, the person would benefit from knowing similar properties in the area that are for sale or rent.

Figure 13:
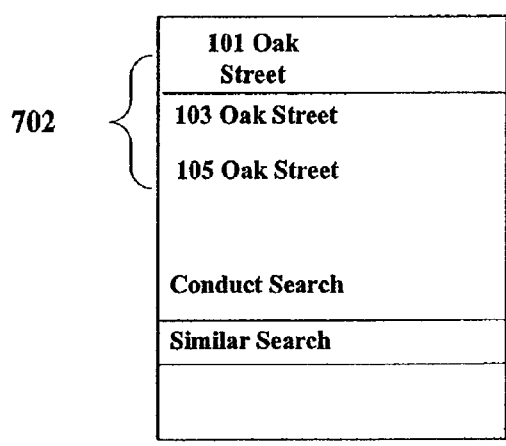
FIG. 13 is an example of a similar search display produced on a wireless device of the system illustrated in FIG. 1.
Figure 14:
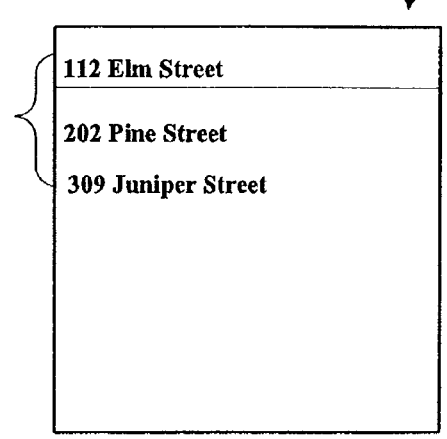
FIG. 14 is an example of a similar search results display produced on a wireless device of the system illustrated in FIG. 1.
Figure 15:
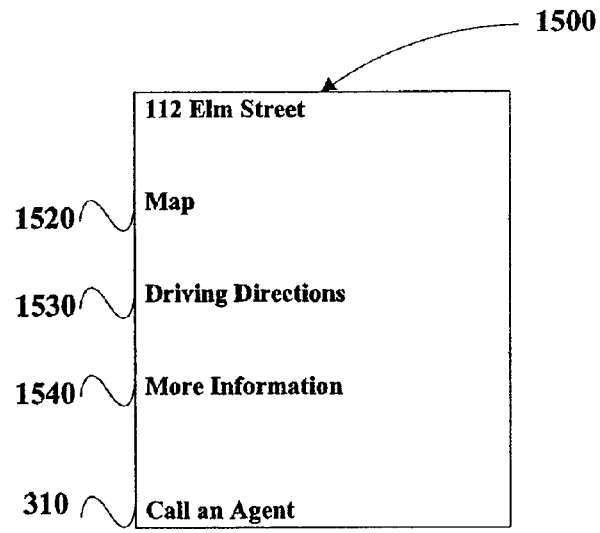
FIG. 15 is an example of a similar search address display produced on a wireless device of the system illustrated in FIG. 1.
Figure 16:
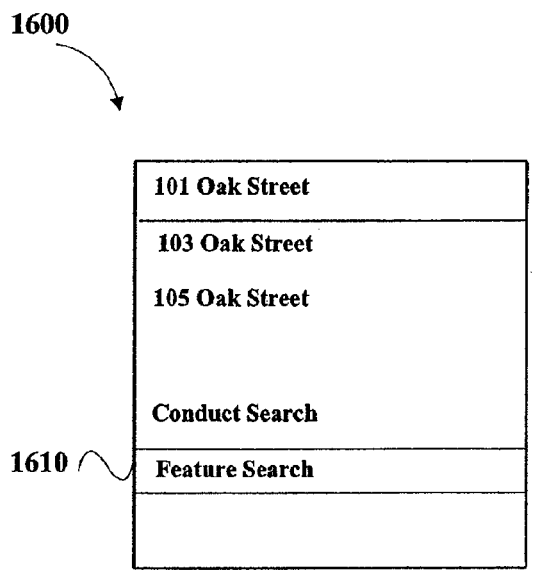
FIG. 16 is an example of a feature search display produced on a wireless device of the system illustrated in FIG. 1.

In the embodiment illustrated in FIGS. 13-15, it is possible for user 106 to search for a landmark that has similar features or attributes as a landmark in front of which user 106 is located. In such a situation, user 106 may view similar search display 1300 that includes a similar search icon 1310. For example, if user 106 is located in front of a home that is not for sale, but user 106 would like to purchase a similar home, by choosing the appropriate location identifier 702, and "similar search" icon 1310, location-centric information system 110 may provide multiple location identifiers or addresses 1410 of second homes that are for sale having similar attributes to the first home. The results may be displayed in a similar search results screen 1400. When user 106 is presented with similar search results screen 1400 with multiple location identifiers 1410, user 106 may then choose a single location identifier or address about which to obtain more detailed information. User 106 may then be presented with a similar search address display 1500. From similar search address display 1500, user 106 may choose to receive a map 1520 to the second home, driving directions 1530 to the second home, and more information 1540 about the second landmark (e.g., sale price, school district, days on market, etc.). The search criteria may be more narrowly defined as described above with reference to FIGS. 7-12 such that only similar homes for sale within a certain radius, price range, etc. are shown.

User 106 may choose which attributes of the home in which they are interested to tailor the search to only include homes for sale that include that particular attribute. For example, if user 106 likes the style of the home (e.g., colonial, split-level) then user 106 may narrow the search criteria to only search for similar homes of a particular style.

The attributes contained in location-centric information system 110 include, but are not limited to, home style, parcel lot size, number of floors, number of bedrooms, number of bathrooms, roof style, window style, architect, builder, landscaping, garage features, kitchen features, flooring features, utility features, color, size, etc.

Figure 17:
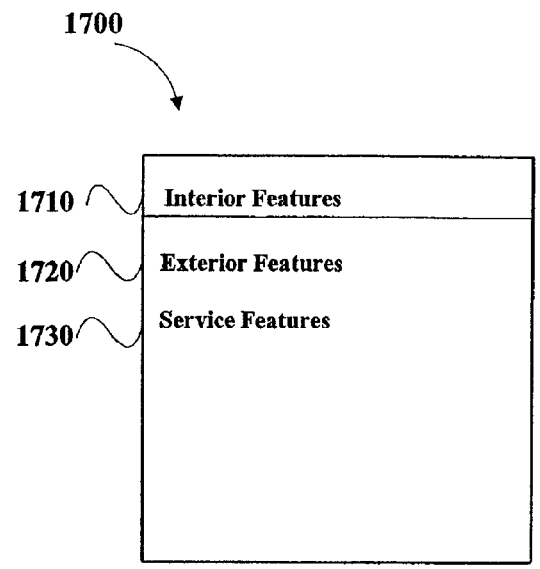
FIG. 17 is an example of a feature selection display produced on a wireless device of the system illustrated in FIG. 1.

User 106 may also obtain detailed information about a particular attribute of a landmark in which they are interested. Referring to FIGS. 16-19, user 106 may be located in front of a landmark that has a particular feature (e.g., landscaping, windows, door, design) in which user 106 is interested. In such a situation, user 106 may view a feature search display 1600 that includes a feature search icon 1610. Upon choosing feature search icon 1610, user 106 views a feature selection display 1700 as illustrated in FIG. 17. Feature selection display 1700 allows user 106 to select the type of feature of interest such as interior feature 1710, exterior feature 1720, or service feature 1730. Interior features may include such features as lighting fixtures, plumbing fixtures, flooring, wallpaper, window treatments, molding, appliances, etc. Exterior features may include such features as roof type, windows, siding, shingles, etc. Service features may include such features as landscaping, gardening, sprinkler systems, pool care etc.

Figure 18:
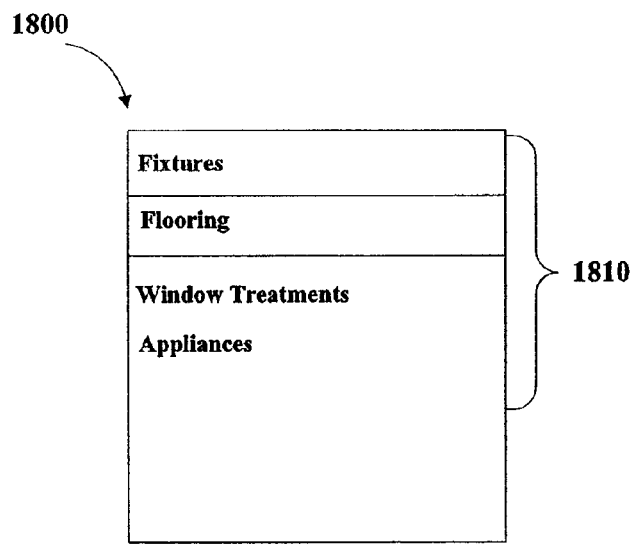
FIG. 18 is an example of a narrow feature selection display produced on a wireless device of the system illustrated in FIG. 1.
Figure 19:
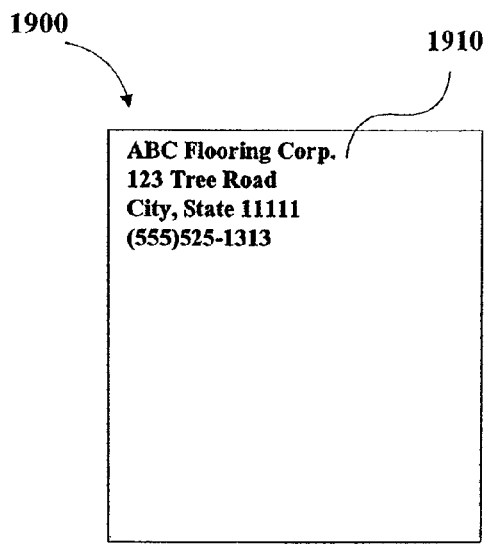
FIG. 19 is an example of a feature detail display produced on a wireless device of the system illustrated in FIG. 1.

When user 106 selects a feature 1710, 1720, 1730, user 106 can view the narrow feature selection display 1800 as illustrated in FIG. 18. From narrow feature selection display 1800, user 106 selects the particular feature of interest from a list of features 1810. The illustrated example includes interior features, but may also include exterior features and service features as apparent. Upon selecting a particular feature, user 106 may be presented with a feature detail display 1900 that includes detailed feature information 1910. The detailed feature information includes specific information about the chosen feature of the particular landmark. The specific information may include contact information for service providers that either manufacture, sell, repair, etc. the particular feature. The detailed feature information may also include contact information for the architect that designed the landmark, service providers related to the landmark, etc. User 106 may desire to view another landmark including similar features as the landmark of interest. In such a situation, user 106 may be presented with similar search results screen 1400 and similar search address display 1500 as described above. In another embodiment, only features for which the location-centric information system has information are provided in the feature list 1810.

For example, if user 106 approached a house that had a certain color and style of brick that was desirable, user 106 would select feature search icon 1610. They would then choose exterior feature 1720 to obtain list 1810 that includes various exterior features. Upon selecting bricks or siding from list 1810, user 106 may be presented with detailed feature information. For example, the detailed feature information may include the manufacturer name, the specific manufacturer specifications for the particular bricks on the home of interest, contact information for the manufacturer, retailers that provide the particular product or similar products, contact information for those retailers, prices of the product, the particular mason or mason-sub-contractor that installed the brick, and other information associated with the brick could be provided or would be apparent etc. Contact information may be provided for particular categories of retailers or manufacturers. For example, in the present embodiment, where user 106 selected bricks from list of features 1810, detailed information regarding retailers and manufacturers of "building products" would be provided in detailed feature information 1910. Such detailed feature information 1910 could be provided for categories of service providers as well.

In another embodiment retailers and manufacturers advertise on location-centric information system 110. When user 106 selects a particular feature from list of features 1810, they may be presented with manufacturers, retailers, or service providers that provide the particular product or similar products or related services, but only if that manufacturer, retailer or service provider advertises on location-centric information system 110. The advertisement may be a paid advertisement or may be provided as a free service for simply registering with the provider of location-centric information system 110.

Figure 21:
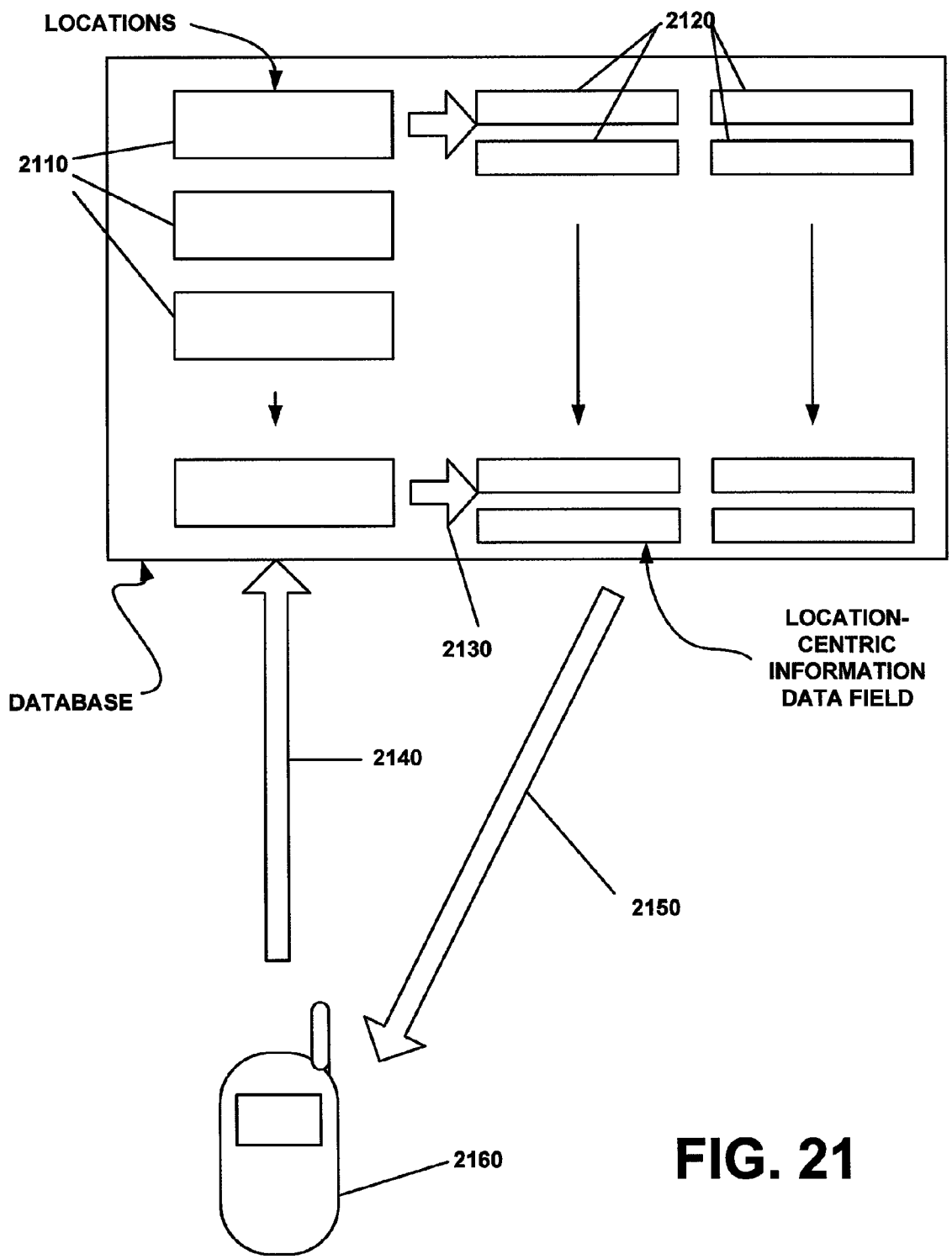
FIG. 21 illustrates the relationship between database information fields and the geographic position, as well as the relationship between the database and the electronic device.

A database according to another aspect of the invention is depicted generally in FIG. 21. The database includes a number of locations 2110 associated with particular volumes in the base grid. Each of these locations has a number of location-centric information data fields, 2120, associated with the location in the database, as illustrated by the arrow 2130. These location-centric information data fields may be configured to be updated dynamically in real-time. Alternatively, they may contain predetermined static information. In the illustrated embodiment, four information data fields are associated with a particular location. It is to be understood that any number of information data fields may be associated with each location.

These data fields may include information pertaining to a landmark at a particular location in one data field, current weather conditions in another data field, and a historical event in another data field. The information stored in this type of a database may include both information that is static (i.e., the historical information and information pertaining to the landmark), and dynamically updated information (i.e., information about current weather conditions).

As illustrated in FIG. 21, the electronic device, 2160, may send location data to the database, as indicated by arrow 2140. In the database, the software searches for the location data field associated with the location of the electronic device 2160. Once that location is found, location-centric information associated with that location is sent to the electronic device, as indicated by arrow 2150. The database and the electronic device may communicate through various means, as described in detail above.

While specific embodiments have been described in detail with respect to landmarks and real-estate, other applications of the invention are within the scope of the invention. For example, a user using the electrical device, the systems, and the methods of the invention may receive real-time information at a baseball game. For example, the electronic device may determine (using GPS or other means as described herein) that the user is at a particular ballpark. The database may be temporally seamless and may include information about the present game being watched. For example, information about the pitcher and batter may be obtained, including season stats, game stats, career stats, personal information, photographs etc. For example, the user of the device may receive a "virtual baseball card" for a particular player. Additionally historical information may be received about the ball park, the teams playing, or individual players. Future information may also be received including the list of players that are due to bat in the next inning, or the available pitchers that may be called in from the bull pen. Also, information about the next game may be received by the user via the electronic device. Similar applications can be implemented with various other sporting events/venues.

In addition to uses at sporting events, the invention finds application in populated areas, such as metropolitan areas. A user of a device may be walking around a metropolitan area and want to eat. Information about the restaurants within a predetermined volume or location may be obtained. For example, the user may ask for information about restaurants within five blocks. The database may contain information about table availability updated in real-time over an internet or a wireless network, and may relay that information to the user of the device. Additionally, the user may obtain information about the current specials available from each restaurant within the predetermined location or volume. The user may also be informed as to whether particular restaurants or bars are carrying a particular sporting event, if there are cover charges, and the amount of the cover charges, whether there is a band playing at a restaurant or bar, and/or the hours of operation of a restaurant or bar.

In another embodiment of the invention, the location-centric information is only transmitted to the wireless when the wireless device is configured with an encryption coder or key. Additionally, the location centric information may only be transmitted to the encrypted wireless device at a particular time or a particular location. For example, the information pertaining to a military operation may only be transmitted to a particular encrypted device at a predetermined time in a predetermined place.

As discussed above, the system and methods of the invention can be implemented in an amusement park. For example, if a user of the device is in an amusement park, the user may be able to obtain real-time information about the length of wait for certain rides or may simply obtain information about rides for which the wait is less than a predetermined time (e.g. 10 minutes).

In an alternative embodiment, the user of the device may be able to track their position relative to another user of the system. For example, in the amusement park embodiment discussed above, both the parents and children in an amusement park could have a wireless device. In this manner, the parents would be able to track the relative position of their children and vise versa.

The principles, embodiments, and modes of operation of the invention have been described in the foregoing description. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the invention. Accordingly, it is expressly intended that all such variations, changes and equivalents which fall within the spirit and scope of the invention as defined in the claims be embraced thereby.

We claim:

1. A non-transitory processor-readable medium storing code representing instructions to cause a processor to perform a process, the code comprising code to:

provide to an information system information related to a geographic location associated with a position of an electronic device, the geographic location being located within a base grid;

receive a location identifier associated with a property at the geographic location from the information system;

receive a first menu of location-centric information associated with the property directly from the information system, the first menu having a first plurality of selectable icons;

transmit data associated with a selection of an icon from the first plurality of icons to the information system; and receive a second menu of location-centric information based on the selection, the second menu having a second plurality of selectable icons, at least one selectable icon from the second plurality of selectable icons including an icon to search for a property for sale within a select distance from the geographic location of the electronic device.

2. The non-transitory processor-readable medium of claim 1, wherein the code is congifured to associate a geocode based on the geographic location with the location-centric information.

3. The non-transitory processor-readable medium of claim 1, wherein the code for receiving the first menu of location-centric information includes code for receiving the first menu of location-centric information in real time.

4. The non-transitory processor-readable medium of claim 1, wherein the code for receiving the first menu of location-centric information includes code for receiving a first menu of location-centric information that has been dynamically updated via a network.

5. The non-transitory processor-readable medium of claim 1, wherein the code for receiving the first menu of location-centric information includes code for receiving a first menu of location-centric sensor information, the sensor information being dynamically updated via a network.

6. The non-transitory processor-readable medium of claim 1, wherein the information system is located at a geographic position different from the geographic position of the electronic device.

7. The non-transitory processor-readable medium of claim 1, wherein the information system is located at a geographic position different from the geographic position of the property.

8. A method, comprising:

providing from an electronic device to an information system information related to a geographic location associated with a position of the electronic device, the geographic location being located within a base grid;

receiving at the electronic device from the information system device a location identifier associated with a property at the geographic location;

receiving at the electronic device a first menu of location-centric information associated with the property directly from the information system, the first menu having a first plurality of selectable icons;

transmitting from the electronic device data associated with a selection of an icon from the first plurality of icons to the information system; and receiving at the electronic device from the information system a second menu of location-centric information based on the selection, the second menu having a second plurality of selectable icons, at least one selectable icon from the second plurality of selectable icons including an icon to search for a property for sale within a select distance from the geographic location of the electronic device.

9. The method of claim 8, further comprising:

associating a geocode with the location-centric information based on the geographic location.

10. The method of claim 8, wherein the receiving the first menu of location-centric information includes receiving the first menu of location-centric information in real time.

11. The method of claim 8, wherein the receiving the first menu of location-centric information includes receiving a first menu of location-centric information that has been dynamically updated via a network.

12. The method of claim 8, wherein the code for receiving the first menu of location-centric information includes code for receiving a first menu of location-centric sensor information, the sensor information being dynamically updated via a network.

13. The method of claim 8, wherein the information system is located at a geographic position different from the geographic position of the electronic device.

14. The method of claim 8, wherein the information system is located at a geographic position different from the geographic position of the property.

* * * * *